(12) United States Patent
Brownfield et al.

(10) Patent No.: US 7,311,884 B2
(45) Date of Patent: Dec. 25, 2007

(54) CONTINUOUS CHLORINE DIOXIDE GENERATION

(75) Inventors: Donald L. Brownfield, Houston, TX (US); Forrest Henson, Jr., Houston, TX (US)

(73) Assignee: JTS Enterprises, Inc., Houston, TX (US)

(*) Notice: Subject to any disclaimer, the term of this patent is extended or adjusted under 35 U.S.C. 154(b) by 814 days.

(21) Appl. No.: 10/730,730

(22) Filed: Dec. 8, 2003

(65) Prior Publication Data
US 2005/0121308 A1  Jun. 9, 2005

(51) Int. Cl.
*B01J 19/08* (2006.01)
(52) U.S. Cl. .................................. 422/186.3
(58) Field of Classification Search ............. 422/186.3
See application file for complete search history.

(56) References Cited

U.S. PATENT DOCUMENTS

| 4,414,180 A | 11/1983 | Fisher |
| 4,456,511 A | 6/1984 | Fisher |
| 4,542,008 A * | 9/1985 | Capuano et al. ............ 423/477 |
| 4,874,489 A | 10/1989 | Callerame |
| 6,171,558 B1 | 1/2001 | Simpson |

FOREIGN PATENT DOCUMENTS

| FR | 1 457 065 | 12/1976 |
| JP | 04300201 | 10/1992 |
| WO | WO 2005/016011 A2 | 2/2005 |

OTHER PUBLICATIONS

G. V. Buxton & M. S. Subhani, Radiation Chemistry & Photochemistry of Oxychlorine Ions Parts 1-3, pp. 947-977, Oct. 18, 1971, Cookridge High Energy Radiation Research Centre.

Herve Cosson and William R. Ernst, *Photodecomposition of Chlorine Dioxide and Sodium Chlorite in Aqueous Solution by Irradiation with Ultraviolet Light*, Ind. Eng. Chem. Res. 1994, 33, 1468-1475, 1994 American Chemical Society.

Toyoaki Aoki and Kimiko Fujie, *Formation of Chlorine Dioxide from Chlorite by UV Irradiation*, Chemistry Express, vol. 7, No. 8, pp. 609-612 (1992), Kinki Chemical Society, Japan.

* cited by examiner

*Primary Examiner*—Kishor Mayekar
(74) *Attorney, Agent, or Firm*—G. Alan Witte

(57) ABSTRACT

The present invention provides a system for continuously and efficiently producing low concentrations of aqueous chlorine dioxide from a dilute continuous feed stream of aqueous chlorite.

13 Claims, 3 Drawing Sheets

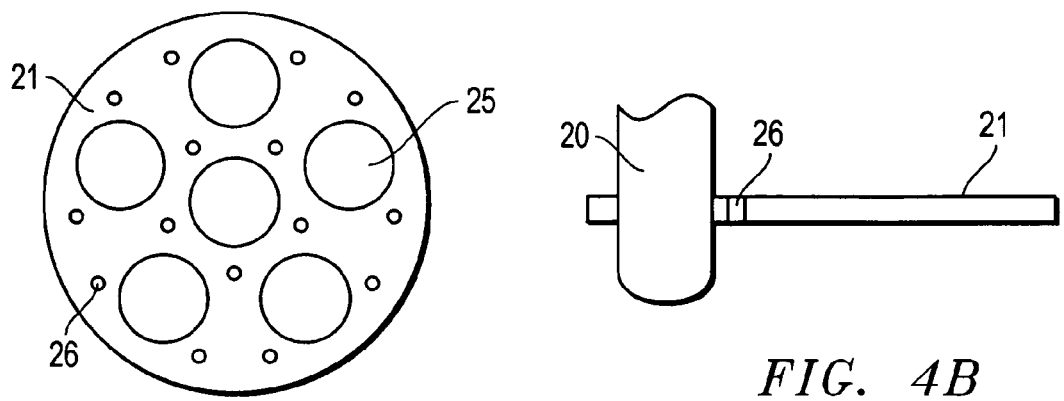
FIG. 4A
FIG. 4B
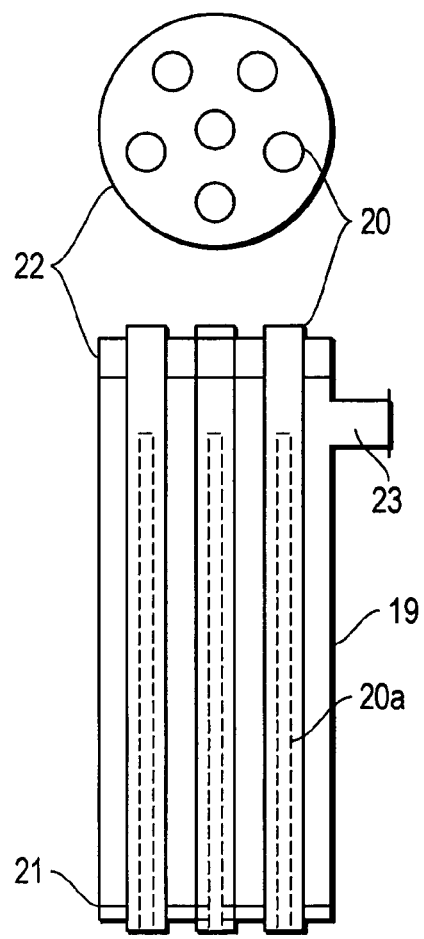
FIG. 5

CONTINUOUS CHLORINE DIOXIDE GENERATION

BACKGROUND OF THE INVENTION

1. Field of the Invention

The present invention relates to the continuous and efficient production of low concentrations of aqueous chlorine dioxide from a dilute continuous feed stream of aqueous chlorite.

2. Description of the Related Art

Chlorine dioxide, $ClO_2$, is a greenish yellow gas with an appreciable solubility in water. It is a powerful, yet selective, oxidant that can kill fungi, bacteria and algae in a variety of applications, among which are the treatment of drinking water, the processing of wastewater, the disinfection of fruit and vegetables, the processing of poultry, and the control of microbiological growth in cooling towers. The benefit of chlorine dioxide as compared to other oxidizing agents in this class, such as chlorine, is that chlorine dioxide's use does not generate unwanted and perhaps hazardous chlorinated organic byproducts. Chlorine dioxide is a powerful oxidizing agent that is readily soluble in water. In its pure gaseous state, it is unstable and cannot be compressed, shipped or stored. Accordingly, chlorine dioxide must be generated at the point of use.

Chlorine dioxide can be generated from a variety of chlorine-containing starting compounds including various salts of the oxychlorine anions such as chlorite and chlorate. The chlorite ion readily reacts with acids or chlorine to form $ClO_2$. Ultraviolet irradiation of aqueous solutions containing the chlorite ion will also generate chlorine dioxide.

Due to the nature of chlorine dioxide, it must be created or generated at the point of consumption or use. Commercially viable technologies have limited its use to applications where generally quantities greater than 5 pounds per day of chlorine dioxide are required.

U.S. Pat. No. 4,414,180 and U.S. Pat. No. 4,456,511 disclose a method for generating chlorine dioxide gas by metering nitrogen or air directly into a generator containing aqueous sodium chlorite, and illuminating by one or more incandescent or fluorescent lamps. The sodium chlorite is photochemically oxidized to chlorine dioxide and the resulting chlorine dioxide is taken into the gas phase by the nitrogen or air gas stream.

U.S. Pat. No. 4,874,489 to Callerame (1989) discloses generating a batch of chlorine dioxide by subjecting chlorite to ultraviolet radiation. The chlorine dioxide can easily be displaced from the reaction with air and dissolved in water to form chlorous acid.

U.S. Pat. No. 6,171,558 discloses a chlorine dioxide generator for use with a container holding aqueous chlorite. The apparatus includes a lamp for generating radiation, a connector or cap attached to the lamp so that the lamp is positioned within the container, and a circulation tube proximate to the light for circulating the aqueous chlorite in contact with the lamp radiation to create chlorine dioxide. Finely divided gas bubbles sweep microbubbles of chlorine dioxide upwardly from the exterior surface of the quartz housing through exit apertures and thence to the field of use. After the aqueous chlorite solution is depleted, the ultraviolet portion of the generator can be removed and reinstalled in a new container of aqueous chlorite, or moved to another location.

For each of the above noted patents, (despite assertions in U.S. Pat. No. 6,171,558) the chlorine dioxide is produced in a batch process and a gas is used to sweep the chlorine dioxide as a gas from the generator vessel.

There are a number of shortcomings with the prior art devices and methods for producing chlorine dioxide by irradiating an aqueous chlorite:

1. Batch processes compared with continuous processes inherently require more equipment and higher cost.
2. Removing the chlorine dioxide as a gas significantly reduces the efficiency which can be obtained.
3. With a batch process, the pH typically increases above 10 resulting in lower conversion of chlorite to chlorine dioxide.
4. With a batch process, the heat from the lamp(s) is not dissipated resulting in a higher lamp operating temperature with a lower ultraviolet wattage output.
5. With a batch process, there exists significant photolytic decomposition of the product chlorine dioxide resulting in a low conversion of chlorite to chlorine dioxide.
6. With a batch process, there exists significant unwanted side reactions that produce unwanted by-products and reduce the conversion efficiency.

SUMMARY OF THE INVENTION

Accordingly, a need exists for a system to safely, reliably and economically produce chlorine dioxide in an aqueous solution on a continuous basis in small quantities (up to about 5 pounds per day of chlorine dioxide). The low concentration continuous feed system of the present invention solves several problems associated with prior art technologies.

1. The system is truly continuous unlike assertions in prior art patents. The system continuously feeds a low concentration chlorite solution and produces a continuous stream of chlorine dioxide solution.
2. Explosion hazards associated with high concentrations of chlorine dioxide are avoided by operating at low concentrations well below the danger level.
3. With a continuous low concentration system, the pH is kept below 10 allowing higher conversion to chlorine dioxide.
4. The continuous flow provides cooling to the lamps maintaining the lamp temperature in the highest output ranges.
5. The continuous flow system adds to the higher efficiency by minimizing the subsequent photolytic decomposition of the product chlorine dioxide.
6. The low concentration regime minimizes unwanted side reactions that produce unwanted by-products and reduce the efficiency of the system.

The present invention provides feeding a stream of aqueous sodium chlorite or other aqueous alkali metal or alkaline earth metal chlorite in concentrations between about 0.001% to about 0.25% to a reacting vessel where the sodium chlorite is irradiated with ultraviolet light to form a product stream that has between about 0.0005% and about 0.05% chlorine dioxide in solution under continuous flow. An important feature of this invention is obtaining high conversion efficiencies of chlorite to chlorine dioxide. This is accomplished by combining a low concentration chlorite feed solution with proper lamp arrangement and spacing and flow distribution to attain a conversion efficiency of between 20% and 43% of chlorite to chlorine dioxide on a sustained basis.

Because of the efficacy of chlorine dioxide as a disinfectant, biocide or selective oxidant, potential applications or markets exist for chlorine dioxide in small quantities of up to about 5 pounds per day. To reach these potential markets, the chlorine dioxide and its generation must be (1) cost effective, (2) safe, (3) easy to use and (4) reliable. Since potential precursor chemicals involved in chlorine dioxide generation are relatively expensive and unreacted precursor chemical and reaction by-products can be of concern, the efficiency of the generation system is important. The prior art technologies have not successfully addressed these issues.

BRIEF DEDSCRIPTION OF THE DRAWINGS

A better understanding of the invention can be obtained when the detailed description of exemplary embodiments set forth below is considered in conjunction with the attached drawings in which.

FIG. 4*a* is a plan view of the distributor plate of the present invention.

FIG. 4*b* is an elevation view of the distributor plate of the present invention.

FIG. 5 is a simplified drawing of the reacting vessel of the present invention.

DETAILED DECRIPTION OF THE EXEMPLARY EMBODIMENTS

The present invention provides a system to produce chlorine dioxide by preparing a feed stream containing about 0.001 wt % to about 0.25 wt % sodium chlorite and with proper feed distribution and configuration, passing the feed stream past ultraviolet radiation in a manner that converts between about 20 wt % and about 43 wt % of the chlorite to chlorine dioxide. The feed and product streams are continuous.

Figure 1:
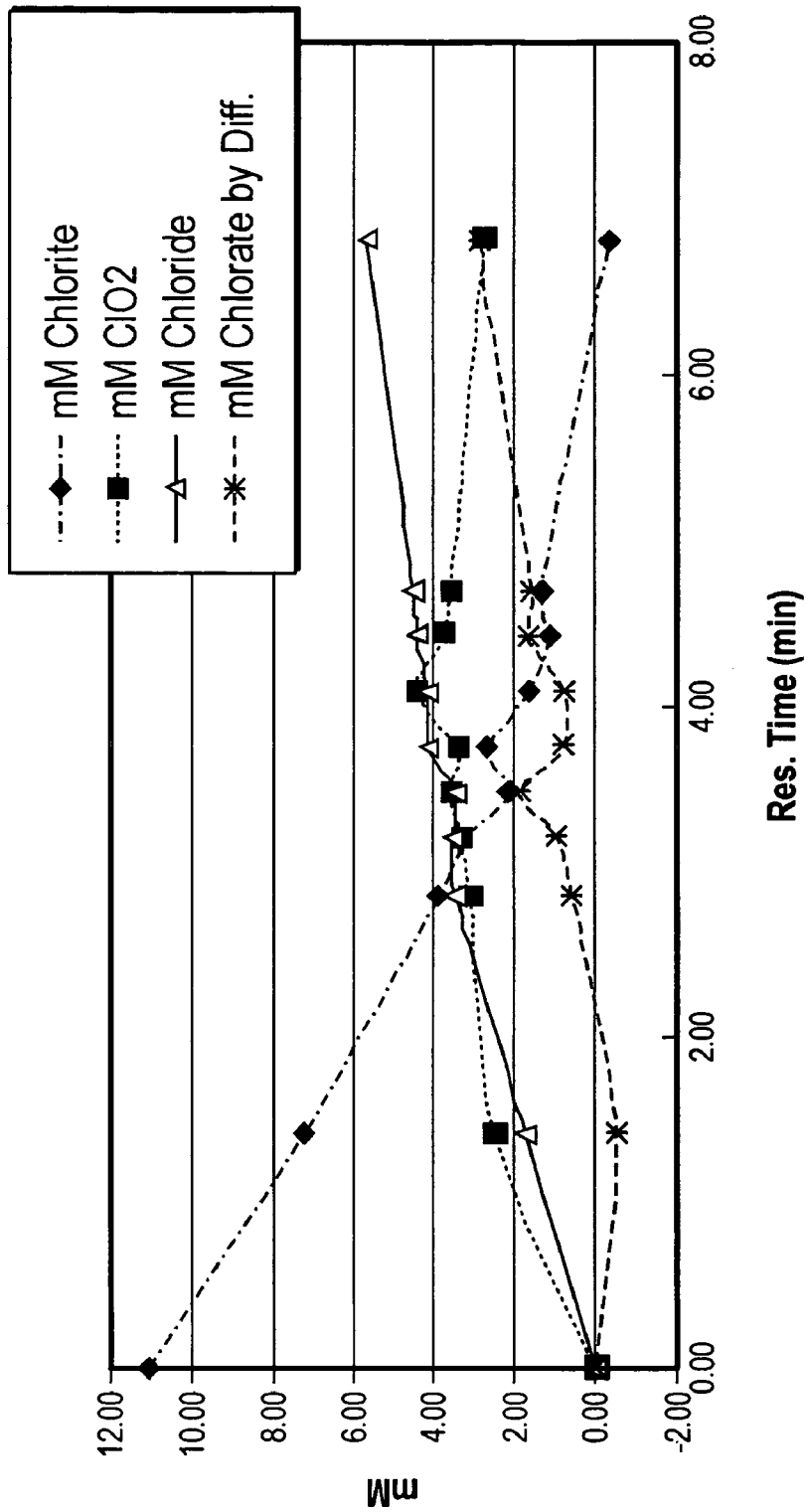
FIG. 1 is a graph of mM Comparison with Residence Time.

FIG. 1 shows one of the typical experimental results comparing the concentration of the feed chlorite ($ClO_2^-$), the chlorine dioxide ($ClO_2$) produced, the chloride ($Cl^-$) produced and the chlorate ($ClO_3^-$) apparently produced all expressed in milli-molar (mM) quantities versus the exposure to ultraviolet light expressed as minutes of residence time of the solution in the reacting vessel. The feed solution had 1000 parts per million (ppm) sodium chlorite and the reacting vessel contained five lamps producing a total of 55 watts of ultraviolet radiation.

It is known that ultraviolet radiation will cause a photochemical reaction with chlorite forming chlorine dioxide and also that the ultraviolet radiation will cause the destruction of the chlorine dioxide. Previous work and patents were based on the assumption that in order to recover the chlorine dioxide before it is subsequently destroyed, the chlorine dioxide must be removed from the ultraviolet radiation source as quickly as possible. Through many experimental trials, it is believed that the reaction producing chlorine dioxide from chlorite will preferentially absorb the ultraviolet radiation and only when there is not chlorite available will the ultraviolet radiation then decompose the chlorine dioxide. This is particularly true when the chlorite feed solution is very dilute and the flow is properly distributed past the ultraviolet source.

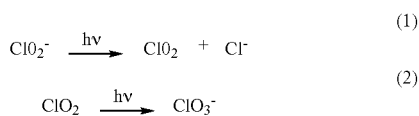

From making and observing many test runs using different combinations of factors, it was observed that when a chlorite solution is irradiated with ultraviolet light produced by a mercury vapor lamp, chlorine dioxide and chloride ions are produced (simplified as reaction #1). The data seems to indicate that the reactions are linked as the chlorine dioxide and chloride ions are produced in approximately equal molar quantities throughout the initial stages of the reaction. The reaction progresses until all of the chlorite is consumed. A further photolytic process converts chlorine dioxide into chlorate ions under the mildly basic conditions employed here (simplified as reaction #2). It is believed that this reaction does not produce chloride ions and does not occur to an appreciable extent until the available chlorite is equal to or less than the chlorine dioxide concentration. Once the chlorite is consumed, the chloride ion concentration remains constant, the chlorine dioxide decreases to zero and the apparent chlorate concentration rises. The complete mechanism by which these reactions occur is not fully understood. The most detailed work in this field was done by Buxton and Subhani in 1971 using flash photolysis techniques and does not explain the time effect seen in this study. Their work predicted that $OCl^-$ is formed or possibly involved in these reactions. A test was run by applicants where a weak $OCl^-$ solution was irradiated with the ultraviolet light source without any $ClO_2^-$ being present. The $OCl^-$ concentration was measured before irradiation and after and showed an almost complete disappearance of the $OCl^-$. The chloride ($Cl^-$) was also measured before and after and there was no change in the concentration. The titration for $OCl^-$ would have also indicated the presence of $Cl_2$ or $ClO_2$, which also were not indicated, leading to the conclusion that the $OCl^-$ was probably being converted to $ClO_3^-$. Reaction #2 from above could actually be going through an $OCl^-$ step based on this test. The reactions likely involve electron transfer as well as oxygen-containing species such as $OH^-$ ions, O atoms and $O^-$ radical anions. Since the reactions occur in a very dilute aqueous solution and the chlorite is initially in the form of sodium (or other alkali metal) chlorite, hydroxide ion and hydrogen are likely formed. The pH was recorded extensively during the various test runs and the pH rises as chlorite reacts but reaches a maximum that is usually less than a 1.5 pH units higher than the initial pH. The pH then begins to decline. The pH will eventually reach the initial value and can go below if the reaction is run to achieve complete conversion of chlorine dioxide into chlorate ion. In the test irradiating $OCl^-$, the beginning pH was 8.17 and dropped to 7.55 after irradiation.

It is preferred that the ultraviolet radiation used is produced in lamps that use low-pressure mercury vapor and produce radiation of primarily 254 nanometers (nm) but also produce smaller amounts of radiation at 185 nm and 315 nm. The preferred lamps produce ultraviolet radiation in excess of 0.8 ultraviolet watts per inch of arc in the lamp. The radiation at 185 nm is also known to produce ozone. The inclusion of the 185 nm radiation in this chlorine dioxide system improved the efficiency by up to 2%. This could be the result of the photolysis of chlorite at the 185 nm or the reaction of ozone produced at that wavelength with the chlorite forming chlorine dioxide.

One of the important elements in this system is balancing the amount of chlorite being fed with the available ultraviolet radiation. The number and type of lamps being used and the ballast that drives them fix the amount of ultraviolet radiation available. The chlorite being fed should correlate with the available ultraviolet radiation. For peak efficiencies, between 0.012 and 0.082 pounds of chlorite ($ClO_2^-$) should be fed to the system each day for each watt of ultraviolet radiation applied. The feed preferably contains between 0.001% and 0.25% chlorite in water solution. Sodium chlorite is available commercially in water solution in strengths from 7.5% to 35% any of which can be used in preparing the feed stream by further diluting with water. In this invention, this is done on a continuous basis by either pumping the required chlorite into a controlled water stream or using the water stream to motivate an eductor to educt the required chlorite into solution.

Figure 2:
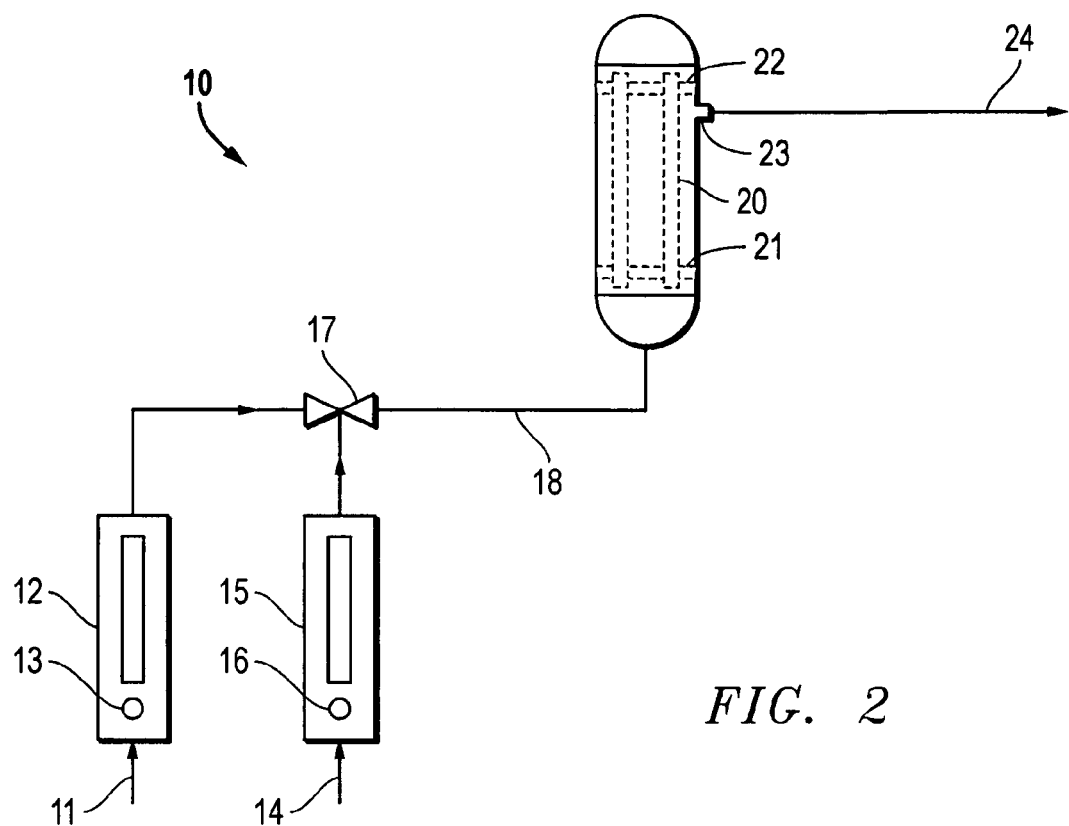
FIG. 2 is a simplified drawing of the overall system of the present invention.

FIG. 2 shows the overall system 10 of the present invention. A source of water feeds the system 10 through the water feed line 11. A flow control device, shown as a rotameter 12 having a valve 13, is used to control the flow of water. A source of chlorite feeds the system 10 through the chlorite feed line 14. A flow control device, shown as a rotameter 15 having a valve 16, is used to control the flow of chlorite. Any suitable flow measurement and flow control devices may be used. An eductor 17 is used to educt the chlorite into the water stream producing a dilute chlorite solution 18 preferably containing between about 0.001 wt % and about 0.25 wt % chlorite. The dilute chlorite solution 18 is fed to the reacting vessel 19, preferably in a lower part of the reacting vessel 19. The reacting vessel 19 contains one or more UV lamps 20a (see FIG. 5) enclosed within one or more quartz or fluoropolymer plastic (e.g., TEFLON) tubes 20, a distributor plate 21, and a holding plate 22. The distributor plate 21 serves to distribute the flow of the dilute chlorite solution 18 such that the dilute chlorite solution 18 will flow in an evenly distributed flow near the one or more UV lamps 20a. The holding plate 22 serves to hold the UV lamps 20a within the reacting vessel 19. The product stream 24 flows out the reacting vessel 19 through the exit nozzle 23. The system 10 produces a product stream 24 having a chlorine dioxide concentration of between about 0.0005 wt % and about 0.05 wt %.

Figure 3:
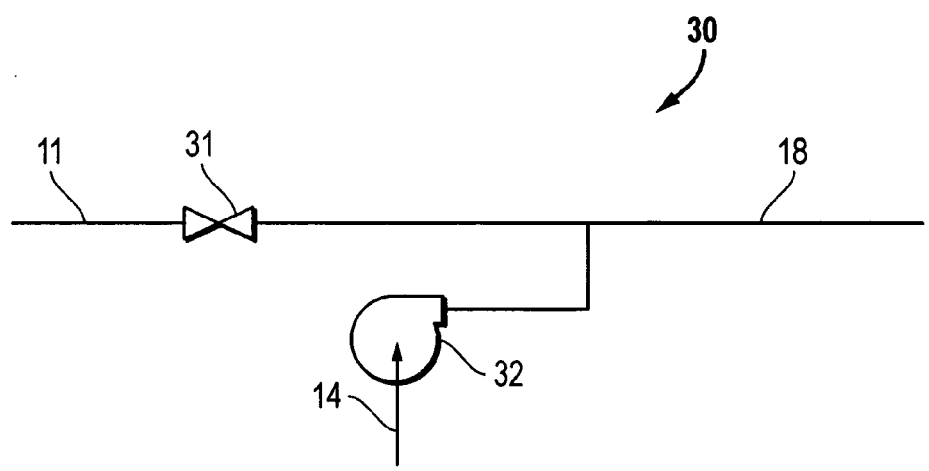
FIG. 3 is a simplified drawing of an alternate feed system for use with the present invention.

FIG. 3 shows an alternate feed system 30. The water feed line 11 is routed to a valve 31 which is used to control the water flow rate. The chlorite is provided to the feed system 30 through the chlorite feed line 14. The chloride is pumped with pump 32 into the water stream to produce the dilute chlorite solution 18.

Generally, the feed systems shown in FIG. 2 is preferred because, if the flow rate of water stops with the FIG. 2 embodiment, the eductor 17 will not operate to educt the chlorite into the system 10. If the water flow rate stops and a high concentration of chlorite is irradiated with the UV lamps (generally, more of a possibility with the FIG. 3 embodiment), then there exists the possibility that high concentration of chlorine dioxide could be generated which would cause an explosion hazard.

Additional details regarding the reacting vessel 19 are shown in FIGS. 4a, 4b, and 5. Preferably, the feed stream enters the reacting vessel at the bottom and passes through the distributor plate 21 shown in FIGS. 4a and b. It is preferred to evenly distribute the flow past the ultraviolet radiation. The distributor plate 21 includes a number of larger holes 25 designed to mate with the quarts or fluoropolymer plastic tubes 20 which holds the UV lights 20a and a number of smaller holes 26 designed to evenly distribute the dilute chlorite solution 18 within the reacting vessel 19. The reacting vessel 19 assembly shown in FIG. 5 contains six lamps 20a with an arc length of 28 inches. The reacting vessel 19 has an inside diameter of 4 inches. The lamps 20a are inside quartz or fluoropolymer plastic tubes 20 in the reacting vessel 19. The lamps are geometrically configured to fit inside a 4 inch diameter reacting vessel 19. The quartz or fluoropolymer plastic tubes 20 protrude through and are sealed at the top of the holding plate 22. This allows the electrical connection to be made outside the liquid inside the reacting vessel 19. The quartz or fluoropolymer plastic tubes 20 are secured at the bottom of the reacting vessel 19 via the distributor plate 21. A pipe cap (not shown) is used to enclose the bottom end of the reacting vessel 19. The distributor plate 21 may be made from ¼ inch thick PVC. The reaction vessel 19 is best operated in the vertical position but will work in any position at a loss of efficiency.

The amount of available ultraviolet radiation is determined by the type, size and number of lamps 20a used. The distribution of the flow past the lamps 20a and the spacing of the flow around the lamps 20a affect the conversion efficiency of the chlorite to chlorine dioxide. The flow of the feed solution should be no more than 0.75 inches from a lamp 20a as it passes through the reacting vessel 19. The system is not dependent on the length of the lamps 20a and works equally well with different arc lengths in the lamps 20a. With a system with multiple lamps 20a, preferably the lamps 20a are spaced in a cluster such that there are not areas where the dilute chlorite solution 18 can form a channel and flow past the lamps 20a without being completely irradiated. The product stream 24 exits the reacting vessel 19 at the top through the exit nozzle 23 after the dilute chlorite stream 18 has passed all of the available arc length of the ultraviolet lamps 20a. This assures that the lamps 20a, surrounded by the quartz or fluoropolymer plastic tubes 20, are always immersed or flooded with liquid. The flow of dilute chlorite solution 18 through the reacting vessel 19 is continuous producing a continuous product stream 24. The lamps 20a generate heat. The flow of the dilute chlorite solution 18 through the reacting vessel 19 provides cooling for the lamps 20a and maintains the temperature at which the lamps are operating at below 120° F. keeping them operating efficiently. Without this cooling effect, the lamps could heat to temperatures where the ultraviolet output is greatly diminished.

Not only does the low concentration of chlorite in the dilute chlorite stream 18 provide for best conversion efficiency, it also eliminates the possibility that the concentration of chlorine dioxide produced in the product stream 24 can reach unsafe levels. Previous systems and technology used higher concentrations of chlorite that was reacted as a batch without continuous input and discharge. In these systems, the chlorine dioxide was removed from the reaction chamber by stripping it out as a gas with air or other inert gas. To keep the solution near the lamps, circulation tubes were used around the quartz tubes and lamps. This invention does not require any gas stripping or internal circulation. This invention produces a continuous stream of chlorine dioxide in water solution.

The present inventive system is advantageous over known chlorine dioxide generators. The present invention provides a safe, reliable, continuous chlorine dioxide product stream 24 having a low concentration of chlorine dioxide (about 0.0005 wt % to about 0.05 wt %) which is suitable for a number of applications such as the treatment of drinking water, the processing of wastewater, the disinfection of fruits and vegetables, the processing of poultry, and the controlling of microbiological growth in cooling towers.

All patents and publications referred to herein are hereby incorporated by reference in their entireties.

Having described the invention above, various modifications of the techniques, procedures, materials, and equipment will be apparent to those skilled in the art. It is intended that all such variations within the scope and spirit of the invention be included within the scope of the appended claims.

What is claimed is:

1. A device for producing an aqueous solution of chlorine dioxide comprising:
   a. a continuous feed system comprising:
   b. a source of an aqueous alkali metal or alkaline earth metal chlorite solution having a concentration of up to about 35 wt %, and
   c. means for diluting with water the alkali metal or alkaline earth metal chlorite solution to produce a continuous feed stream having a chlorite concentration of between about 0.001 wt % and about 0.25 wt %; and
   d. a reacting vessel in fluid communication with the feed system comprising:
      at least one ultraviolet lamp located in the reacting vessel, and
      a distributor plate located in the reacting vessel.

2. The device of claim 1, wherein the feed system adds chlorite to a water stream by either pumping the chlorite or educting the chlorite into the water stream.

3. The device of claim 1, wherein the at least one ultraviolet lamp is enclosed in at least one quartz or fluoropolymer plastic tube.

4. The device of claim 3, wherein the at least one quartz or fluoropolymer plastic tube extends through an end of the reacting vessel allowing access for an electrical supply to the at least one ultraviolet lamp.

5. The device of claim 1, wherein the reacting vessel has a connection where the feed stream enters the reacting vessel and a connection wherein a product stream exits the reaction vessel.

6. The device of claim 5, wherein the reacting vessel has at least one quartz or fluoropolymer plastic tube that protrudes through the distributor plate located near the connection where the feed stream enters.

7. The device of claim 6, wherein the distributor plate is designed to provide a balanced flow of the feed stream past the at least one quartz or fluoropolymer plastic tubes containing the ultraviolet lamps.

8. The device of claim 1, wherein the continuous feed stream flowing through the reaction vessel provides cooling for the at least one ultraviolet lamp maintaining a temperature below about 120° F.

9. The device of claim 3, wherein the maximum distance from a quartz or fluoropolymer plastic tube outward perpendicular to the quartz or fluoropolymer plastic tube to the nearest object is less than about 0.75 inches.

10. The device of claim 1, wherein the reacting vessel is irradiated with between 150 and 200 ultraviolet watts of radiation continuously over a 24 hour period in producing one pound of chlorine dioxide.

11. The device of claim 1, wherein the reacting vessel requires no gas for stripping the chlorine dioxide from the feed solution and transporting it to another solution.

12. The device of claim 1, wherein the reacting vessel has no internal circulation tubes.

13. The device of claim 1, wherein the reacting vessel produces a continuous product stream of aqueous chlorine dioxide.

* * * * *